United States Patent
Jun et al.

(10) Patent No.: US 12,553,099 B2
(45) Date of Patent: Feb. 17, 2026

(54) COLD ROLLED AND COATED STEEL SHEET AND A METHOD OF MANUFACTURING THEREOF

(71) Applicant: ArcelorMittal, Luxembourg (LU)

(72) Inventors: Hyun Jo Jun, Clinton, NJ (US); Narayan Pottore, Munster, IN (US); Dongwei Fan, Munster, IN (US); Xiang Chen, Oak Ridge, TN (US); Oleg Yakubovsky, Las Cruces, NM (US)

(73) Assignee: ArcelorMittal, Luxembourg (LU)

( * ) Notice: Subject to any disclaimer, the term of this patent is extended or adjusted under 35 U.S.C. 154(b) by 792 days.

(21) Appl. No.: 17/616,162

(22) PCT Filed: May 12, 2020

(86) PCT No.: PCT/IB2020/054463
§ 371 (c)(1),
(2) Date: Dec. 2, 2021

(87) PCT Pub. No.: WO2020/245678
PCT Pub. Date: Dec. 10, 2020

(65) Prior Publication Data
US 2022/0259689 A1    Aug. 18, 2022

(30) Foreign Application Priority Data

Jun. 3, 2019 (WO) .................. PCT/IB2019/054577

(51) Int. Cl.
| | |
|---|---|
| *C21D 9/46* | (2006.01) |
| *C21D 6/00* | (2006.01) |
| *C21D 8/02* | (2006.01) |
| *C21D 8/0221* | (2026.01) |
| *C21D 8/0247* | (2026.01) |
| *C22C 38/00* | (2006.01) |
| *C22C 38/02* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |

(Continued)

(52) U.S. Cl.
CPC .............. *C21D 9/46* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/005* (2013.01); *C22C 38/02* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C23C 2/02* (2013.01); *C23C 2/0224* (2022.08); *C23C 2/024* (2022.08); *C21D 2211/001* (2013.01); *C21D 2211/002* (2013.01); *C21D 2211/005* (2013.01); *C21D 2211/008* (2013.01)

(58) Field of Classification Search
CPC .......... C21D 9/46; C21D 6/005; C21D 6/008; C21D 8/0205; C21D 8/0226; C21D 8/0236; C21D 8/0263; C21D 2211/001; C21D 2211/005; C21D 2211/008; C22C 38/02; C22C 38/06
See application file for complete search history.

(56) References Cited

U.S. PATENT DOCUMENTS

| | | | |
|---|---|---|---|
| 2004/0055667 A1* | 3/2004 | Takada | ...................... C23C 2/29 148/533 |
| 2011/0024004 A1 | 2/2011 | Azuma et al. | |
| 2012/0118438 A1 | 5/2012 | Nakagaito et al. | |
| 2014/0000765 A1 | 1/2014 | Nozaki et al. | |
| 2014/0255725 A1 | 9/2014 | Yamanaka et al. | |
| 2015/0000797 A1 | 1/2015 | Sebald et al. | |
| 2015/0044504 A1 | 2/2015 | Ennis et al. | |

(Continued)

FOREIGN PATENT DOCUMENTS

| | | |
|---|---|---|
| CA | 3008062 A1 | 6/2017 |
| CA | 3047690 A1 | 6/2018 |

(Continued)

OTHER PUBLICATIONS

Search Report of PCT/IB2020/054463 dated Jul. 20, 2020.
Written opinion for PCT/IB2020/054463.

*Primary Examiner* — Christina A Johnson
(74) *Attorney, Agent, or Firm* — Davidson Kappel LLC

(57) ABSTRACT

A cold rolled and coated steel sheet having a composition including of the following elements, expressed in percentage by weight: 0.140%≤Carbon≤0.2%, 1.5%≤Manganese≤2.15%, 0.5%≤Silicon≤0.8%, 0.4%≤Aluminum≤0.8%, 0%≤Phosphorus≤0.09%, 0%≤Sulfur≤0.09%, 0%≤Nitrogen≤0.09%, 0.01%≤Niobium≤0.1%, 0.01%≤Titanium≤0.1%, and can contain one or more of the following optional elements 0%≤Chromium≤0.1%, 0%≤Nickel≤3%, 0%≤Calcium≤0.005%, 0%≤Copper≤2%, 0%≤Molybdenum≤0.5%, 0%≤Vanadium≤0.1%, 0%≤Boron≤0.003%, 0%≤Cerium≤0.1%, 0%≤Magnesium≤0.010%, 0%≤Zirconium≤0.010% the remainder composition being composed of iron and unavoidable impurities caused by processing, the microstructure of the steel sheet including in area fraction, 40 to 60% Inter-critical Ferrite, 25 to 45% Transformed Ferrite, 8% to 20% and 5% to 20% Fresh Martensite, 0 to 10% Bainite, wherein the cumulated amount of Inter-critical and Transformed Ferrite is between 75% and 85%.

26 Claims, No Drawings

(51) Int. Cl.
  *C22C 38/54* (2006.01)
  *C22C 38/58* (2006.01)
  *C23C 2/02* (2006.01)

(56) References Cited

U.S. PATENT DOCUMENTS

| | | |
|---|---|---|
| 2015/0122377 A1 | 5/2015 | Bocharova et al. |
| 2016/0017472 A1 | 1/2016 | Ennis |
| 2017/0218471 A1 | 8/2017 | Bongards et al. |
| 2018/0230570 A1 | 8/2018 | Van Krevel et al. |
| 2019/0127820 A1 | 5/2019 | Hasegawa et al. |
| 2019/0203316 A1 | 7/2019 | Minami et al. |
| 2021/0040576 A1 | 2/2021 | Uta et al. |

FOREIGN PATENT DOCUMENTS

| | | | |
|---|---|---|---|
| CA | 3047945 A1 | | 7/2018 |
| CN | 101999007 | | 3/2011 |
| CN | 102409222 A | | 4/2012 |
| CN | 102952996 A | | 3/2013 |
| CN | 103827343 | | 5/2014 |
| CN | 104583424 | | 4/2015 |
| CN | 108463340 A | | 8/2018 |
| CN | 111979489 A | | 11/2020 |
| EP | 1365037 A1 | | 11/2003 |
| EP | 2749665 A1 | | 7/2014 |
| EP | 2762602 A1 | | 8/2014 |
| EP | 2803748 A1 | | 11/2014 |
| EP | 2811047 A1 | | 12/2014 |
| EP | 2837707 A1 | | 2/2015 |
| EP | 2768989 B1 | | 11/2015 |
| EP | 3399066 A1 | | 11/2018 |
| EP | 3394297 B1 | | 2/2020 |
| JP | 2008231480 A | | 10/2008 |
| JP | 2008291304 A | | 12/2008 |
| JP | 2011102437 A | | 5/2011 |
| JP | 4737319 B2 | | 7/2011 |
| JP | 2011149066 A | | 8/2011 |
| JP | 2012041573 A | * | 3/2012 |
| JP | 2013515167 A | | 5/2013 |
| KR | 20130123460 | | 11/2013 |
| KR | 20180120715 A | | 11/2018 |
| WO | WO2016072477 A1 | | 5/2016 |
| WO | WO2017125809 A1 | | 7/2017 |
| WO | WO2017164346 A1 | | 9/2017 |
| WO | WO2018043473 A1 | | 3/2018 |
| WO | WO2019026113 A1 | | 2/2019 |
| WO | WO 2019092483 A1 | | 5/2019 |
| WO | WO2020/245668 | | 12/2020 |

* cited by examiner

COLD ROLLED AND COATED STEEL SHEET AND A METHOD OF MANUFACTURING THEREOF

The present invention relates to cold rolled coated steel sheets suitable for use as steel sheet for automobiles.

BACKGROUND

Automotive parts are required to satisfy two inconsistent necessities, namely ease of forming and strength, but in recent years a third requirement of improvement in fuel consumption is also bestowed upon automobiles in view of global environment concerns. Thus, now automotive parts must be made of material having high formability in order to fit in the criteria of ease of fit in the intricate automobile assembly and at same time improve strength for vehicle crashworthiness and durability while reducing a weight of vehicle to improve fuel efficiency.

Therefore, intense Research and development endeavors are put in to reduce the amount of material utilized in a car by increasing the strength of material. Conversely, an increase in strength of steel sheets decreases formability, and thus development of materials having both high strength and high formability is necessitated.

Earlier research and developments in the field of high strength and high formability steel sheets have resulted in several methods for producing high strength and high formability steel sheets.

SUMMARY OF THE INVENTION

EP2768989 claims to have a high strength hot dip galvanised steel strip consisting, in mass percent, of the following elements 0.13-0.19% C, 1.70-2.50% Mn, max 0.15% Si, 0.40-1.00% Al, 0.05-0.25% Cr, 0.01-0.05% Nb, Max 0.10% P, max 0.004% Ca, max 0.05% S, max 0.007% N, and optionally at least one of the following elements max 0.50% Ti, max 0.40% V, max 0.50% Mo, max 0.50% Ni, max 0.50% Cu, max 0.005% B, the balance being Fe and inevitable impurities, wherein 0.40%<Al+SI<1.05% and Mn+Cr>1.90%, wherein the hot dip galvanised steel strip has a microstructure containing 8-12% retained austenite, 10-20% martensite, the remainder being a mixture of ferrite and bainite, the hot dip galvanised steel strip containing not more than 10% bainite, and wherein the hot dip galvanised steel strip has an ultimate tensile strength Rm of at least 700 MPa, an 0.2% proof strength Rp of at least 400 MPa and a total elongation of at least 18%. The Steel of EP2768989 do not foresee a steel with strength of 780 MPa or more while preferring elongation above 20%.

An object of the present invention is to solve these problems by making available cold-rolled steel sheets that simultaneously have:
- an ultimate tensile strength greater than or equal to 780 MPa and preferably above 800 MPa,
- a yield strength greater than or equal to 400 MPa and preferably above 450 MPa
- an total elongation greater than or equal to 18% and preferably above 20%.
- a hole expansion ratio of greater than or equal to 20% and preferably above 22%.

Preferably, such steel can also have a good suitability for forming, for rolling with good weldability and coatability.

Another object of the present invention is also to make available a method for the manufacturing of these sheets that is compatible with conventional industrial applications while being robust towards manufacturing parameters shifts.

DETAILED DESCRIPTION

The cold rolled and heat treated steel sheet of the present invention is be coated with zinc or zinc alloys, or with aluminium or aluminium alloys to improve its corrosion resistance.

Carbon is present in the steel between 0.140% and 0.2%. Carbon is an element necessary for increasing the strength of the steel sheet by producing low-temperature transformation phases such as martensite and bainite, further Carbon also plays a pivotal role in Austenite stabilization and hence is a necessary element for securing Residual Austenite. Therefore, Carbon plays two pivotal roles: one in increasing the strength and another in retaining austenite to impart ductility. But Carbon content less than 0.140% will not be able to stabilize Austenite in an adequate amount required by the steel of the present invention. On the other hand, at a Carbon content exceeding 0.2%, the steel exhibits poor spot weldability which limits its application for the automotive parts. The presence of Fresh Martensite can be high if Carbon is present beyond 0.2% which is detrimental for the ductility. The preferred range for carbon for the steel of the present invention is 0.140% to 0.19% and more preferably 0.140% to 0.18%.

Manganese content of the steel of the present invention is between 1.5% and 2.15%. This element is gammagenous. The purpose of adding Manganese is essentially to obtain a structure that contains Austenite and impart strength to the steel. An amount of at least 1.5% by weight of Manganese has been found to provide the strength and hardenability of the steel sheet as well as to stabilize Austenite. In addition the Manganese content of above 2.15% also reduces the ductility and also deteriorates the weldability of the present steel hence the elongation targets may not be achieved. A preferable content for the present invention may be kept between 1.7% and 2.15%, furthermore preferably 1.8% and 2.15%.

Silicon content of the steel of the present invention is between 0.5% and 0.8%. Silicon is a constituent that can retard the precipitation of carbides during cooling after annealing temperature and overageing, therefore, due to the presence of Silicon, carbon rich Austenite is stabilized at room temperature However, disproportionate content of Silicon does not produce the mentioned effect and leads to a problem such as temper embrittlement and Liquid metal embrittlement. Therefore, the concentration is controlled within an upper limit of 0.8%. A preferable content for the present invention may be kept between 0.5% and 0.7%

Aluminum is an essential element and is present in the steel of the present invention between 0.4% and 0.8%. Aluminum promotes ferrite formation and increases the Ms temperature which allows the present invention to have both Martensite and Ferrite in adequate amount as required to impart steel of the present invention with ductility as well as strength. However, when the presence of Aluminum is more than 0.8%, it increases the Ac3 temperature which makes the annealing and hot rolling finishing temperatures in complete Austenitic region economically unreasonable. The Aluminum content is preferably limited between 0.4% and 0.7% and more preferably 0.4% and 0.6%.

The cumulative amount of Silicon and Aluminium is preferably between 0.9% and 1.2% and more preferably between 1% and 1.2%, to ensure the amount of residual austenite as well as Ferrite as per the invention and a total elongation of 18%, or even of 20% and a hole expansion ratio of 20% simultaneously.

Phosphorus is not an essential element but may be contained as an impurity in steel and from the point of view of the present invention the phosphorus content is preferably as low as possible, and below 0.09%. Phosphorus reduces the spot weldability and the hot ductility, particularly due to its tendency to segregate at the grain boundaries or co-segregate with manganese. For these reasons, its content is limited to less than 0.09, preferably less than 0.03% and more preferably less than 0.014%.

Sulfur is not an essential element but may be contained as an impurity in steel and from the point of view of the present invention the Sulfur content is preferably as low as possible, but is 0.09% or less from the viewpoint of manufacturing cost. Further if higher Sulfur is present in steel it combines to form Sulfides especially with Manganese and reduces its beneficial impact on the steel of the present invention.

Nitrogen is limited to 0.09% to avoid ageing of material and to minimize the precipitation of nitrides during solidification which are detrimental for mechanical properties of the Steel.

Chromium is an optional element for the present invention. Chromium content is present in the steel of the present invention between 0% and 0.1%. Chromium provides strength and hardening to the steel but when used above 0.1% it impairs surface finish of steel.

Nickel may be added as an optional element in an amount up to 3% to increase the strength of the steel and to improve its toughness. A minimum of 0.01% is preferred to produce such effects. However, when its content is above 3%, Nickel causes ductility deterioration.

Niobium is an essential element for the present invention. Niobium content present in the steel of the present invention between 0.01% to 0.1% and is added in the Steel of the present invention for forming carbo-nitrides to impart strength to the Steel of the present invention by precipitation hardening. Niobium will also impact the size of microstructural components through its precipitation as carbo-nitrides and by retarding the recrystallization during the heating process. Thus finer microstructure formed at the end of the holding temperature and as a consequence after the completion of annealing which provide the steel of the present invention with hole expansion ratio. However, Niobium content above 0.1% is not economically interesting as a saturation effect of its influence is observed and this means that additional amount of Niobium does not result in any strength improvement of the product.

Titanium is an essential element and may be added to the Steel of the present invention between 0.01% and 0.1%. As Niobium, it is involved in carbo-nitrides formation so plays a role in hardening of the Steel of the present invention. In addition, Titanium also forms Titanium-nitrides which appear during solidification of the cast product. The amount of Titanium is so limited to 0.1% to avoid formation of coarse Titanium-nitrides detrimental for formability. In case the Titanium content is below 0.01% it does not impart any effect on the steel of the present invention.

Calcium content in the steel of the present invention is up to 0.005%. Calcium is added to steel of the present invention as an optional element especially during the inclusion treatment with a preferred minimum amount of 0.0001%. Calcium contributes towards the refining of Steel by arresting the detrimental Sulfur content in globular form, thereby, retarding the harmful effects of Sulfur.

Copper may be added as an optional element in an amount up to 2% to increase the strength of the steel and to improve its corrosion resistance. A minimum of 0.01% of Copper is preferred to get such effect. However, when its content is above 2%, it can degrade the surface aspects.

Molybdenum is an optional element that constitutes up to 0.5% of the Steel of the present invention; Molybdenum plays an effective role in determining hardenability and hardness, delays the appearance of Bainite and avoids carbides precipitation in Bainite. However, the addition of Molybdenum excessively increases the cost of the addition of alloy elements, so that for economic reasons its content is limited to 0.5%.

Vanadium is effective in enhancing the strength of steel by forming carbides or carbo-nitrides and the upper limit is 0.1% due to the economic reasons. Other elements such as Cerium, Boron, Magnesium or Zirconium can be added individually or in combination in the following proportions by weight: Cerium≤0.1%, Boron≤ 0.003%, Magnesium≤0.010% and Zirconium≤0.010%. Up to the maximum content levels indicated, these elements make it possible to refine the grain during solidification. The remainder of the composition of the Steel consists of iron and inevitable impurities resulting from processing.

The microstructure of the Steel sheet will now be described.

Inter-critical ferrite constitutes between 40% and 60% of microstructure by area fraction of the steel of the present invention. This inter-critical ferrite imparts the steel of the present invention with a hole expansion ratio of at least 20%. The intercritical ferrite results from the annealing at a temperature below Ac3. The intercritical ferrite is different from the ferrite that could be created after the annealing, named hereinafter "transformed ferrite", that will be described below. In particular, contrarily to the transformed ferrite, the intercritical ferrite is polygonal. Besides, the transformed ferrite is enriched in carbon and manganese, i.e. has carbon and manganese contents which are higher than the carbon and manganese contents of the intercritical ferrite. The intercritical ferrite and the transformed ferrite can therefore be differentiated by observing a micrograph with a FEG-TEM microscope using secondary electrons, after etching with metabisulfite. On such micrograph, the intercritical ferrite appears in medium grey, whereas the transformed ferrite appears in dark grey, owing to its higher carbon and manganese contents Transformed Ferrite constitutes from 25% to 45% of microstructure by area fraction for the Steel of the present invention. Transformed Ferrite of present invention constitutes of Ferrite after annealing and bainitic ferrite formed during soaking for coating the steel. Transformed Ferrite imparts high strength as well as elongation to the steel of the present invention. To ensure an elongation of 18% and preferably 20% or more it is necessary to have 25% of transformed ferrite. Transformed Ferrite of the present invention is formed during cooling done after annealing and during soaking for coating the steel. Transformed Ferrite of the present steel is rich in carbon and Manganese as compared to the inter-critical ferrite. But whenever the transformed ferrite content is present above 45% in steel of the present invention it is not possible to have both the desired tensile strength and the total elongation at the same time. The preferred limit for presence of ferrite for the present invention is between 25% and 40% and more preferably 25% and 35%.

Residual Austenite constitutes from 8% to 20% by area fraction of the Steel. Residual Austenite of the Steel according to the invention imparts an enhanced ductility due to the TRIP effect. The preferable limit for the presence of Austenite is between 8% and 18% and more preferably between 8% and 15%. The Residual Austenite of the present invention preferably contains carbon in an amount of 0.8% to 1.1, more preferably between 0.9% and 1.1% and even better between 0.95% and 1.05%.

The cumulated amount of transformed ferrite and inter-critical ferrite must be between 75% and 85%. This cumulative amount of transformed ferrite and inter-critical ferrite ensures that the steel of the present invention always have a total elongation above 18% as well as an hole expansion ratio of 20% simultaneously.

Fresh Martensite constitutes between 5% and 20% of microstructure by area fraction. Fresh Martensite forms during cooling after the coating of cold rolled steel sheet. Martensite impart strength to the Steel of the present invention. However, when martensite presence is above 20%. it imparts excess strength but diminishes the elongation and hole expansion ratio beyond acceptable limit for the steel of the present invention. Preferred limit for martensite for the steel of the present invention is between 5% and 15% and a more preferable limit is between 10% and 15%.

Bainite constitutes from 0% to 10% of microstructure by area fraction for the steel of the invention and it is an optional microstructure. Bainite can be under the form of bainitic ferrite and/or carbide free bainite. Bainite may be formed during overaging holding before coating. Bainite impart strength to the steel of the present invention. To achieve the tensile strength of 780 MPa or more it is preferred to have 2% bainite but above 10% of bainite the steel do not achieve the hole expansion ratio. The preferred limit for Bainite is between 2% and 10% and a more preferable limit is between 5% and 10%.

In addition to the above-mentioned microstructure, the microstructure of the cold rolled and heat treated steel sheet is free from microstructural components, such as pearlite, tempered martensite and cementite without impairing the mechanical properties of the steel sheets.

A steel sheet according to the invention can be produced by any suitable method. A preferred method consists in providing a semi-finished casting of steel with a chemical composition according to the invention. The casting can be done either into ingots or continuously in form of thin slabs or thin strips, i.e. with a thickness ranging from approximately 220 mm for slabs up to several tens of millimeters for thin strip.

For example, a slab having the above-described chemical composition is manufactured by continuous casting wherein the slab optionally underwent the direct soft reduction during the continuous casting process to avoid central segregation and to ensure a ratio of local Carbon to nominal Carbon kept below 1.10. The slab provided by continuous casting process can be used directly at a high temperature after the continuous casting or may be first cooled to room temperature and then reheated for hot rolling.

The temperature of the slab, which is subjected to hot rolling, is at least 1000° C. and must be below 1280° C. In case the temperature of the slab is lower than 1000° C., excessive load is imposed on a rolling mill and, further, the temperature of the steel may decrease to a Ferrite transformation temperature during finishing rolling, whereby the steel will be rolled in a state in which transformed Ferrite contained in the structure. Therefore, the temperature of the slab is preferably sufficiently high so that hot rolling can be completed in the temperature range of Ac3+100° C. to Ac3+200° C. and final rolling temperature remains above Ac3. Reheating at temperatures above 1280° C. must be avoided because they are industrially expensive.

A final rolling temperature range between Ac3 to Ac3+200° C. is necessary to have a structure that is favorable to recrystallization and rolling. It is preferred that the final rolling pass to be performed at a temperature greater than 950° C., because below this temperature the steel sheet exhibits a significant drop in rollability. The hot rolled steel obtained in this manner is then cooled at a cooling rate above 30° C./s to the coiling temperature which must be between 475° C. and 650° C. Preferably, the cooling rate will be less than or equal to 200° C./s.

The hot rolled steel is then coiled at a coiling temperature between 475° C. and 650° C. to avoid ovalization and preferably between 475° C. and 625° C. to avoid scale formation. A more preferred range for such coiling temperature is between 500° C. and 625° C. The coiled hot rolled steel is cooled down to room temperature before subjecting it to optional hot band annealing.

The hot rolled steel may be subjected to an optional scale removal step to remove the scale formed during the hot rolling before optional hot band annealing. The hot rolled sheet may then subjected to an optional Hot Band Annealing at, for example, temperatures between 400° C. and 750° C. for at least 12 hours and not more than 96 hours, the temperature remaining below 750° C. to avoid transforming partially the hot-rolled microstructure and, therefore, losing the microstructure homogeneity. Thereafter, an optional scale removal step of this hot rolled steel may performed through, for example, pickling of such sheet.

This hot rolled steel is subjected to cold rolling to obtain a cold rolled steel sheet with a thickness reduction between 35 to 90%. The cold rolled steel sheet obtained from cold rolling process is then subjected to annealing to impart the steel of the present invention with microstructure and mechanical properties.

To anneal the said cold rolled steel sheet, it is heated up to the soaking temperature between Ac1 and Ac3, with a heating rate of at least 3° C./s, then the annealing is performed at that temperature during 5 to 500 seconds, preferably during 50 to 250 seconds. In a preferred embodiment, the heating is at least 10° C./s and more preferably at least 15° C./s.

The preferred annealing soaking temperature is between Ac1+30° C. and Ac3 and more preferably between Ac1+30° C. and Ac3-30° C.

In a preferred embodiment, the time and temperature of soaking are selected so as to ensure that the microstructure of the steel sheet at the end of the soaking contains at least 40% of Austenite and more preferably at least 50% of austenite.

Then the cold rolled steel is cooled from the soaking temperature to an overaging holding temperature between 425° C. and 500° C., preferably between 440° C. and 480° C., at an average cooling rate of at least 5° C./s and preferably at least 10° C./s.

The cold rolled steel sheet is then held at the overaging temperature during 5 to 500 seconds.

The cold rolled steel sheet can then be brought to the temperature of the coating bath between 420° C. and 680° C., depending on the nature of the coating, to facilitate hot dip coating of the cold rolled steel sheet.

Then, the coated cold rolled steel sheet is cooled to room temperature from the coating bath temperature at cooling rate of at least 5° C./s and preferably at least 9° C./s to ensure the formation of Fresh martensite in the steel of the present invention.

After cooling to room temperature the cold rolled and coated steel sheet is obtained. The cold rolled steel sheet can also be coated by any of the known industrial processes such as Electro-galvanization, JVD, PVD, etc, which may not require bringing it to the above mentioned temperature range before coating.

EXAMPLES

The following tests, examples, figurative exemplification and tables which are presented herein are non-restricting in nature and must be considered for purposes of illustration only, and will display the advantageous features of the present invention.

Steel sheets made of steels with different compositions are gathered in Table 1, where the steel sheets are produced according to process parameters as stipulated in Table 2, respectively. Thereafter Table 3 gathers the microstructures of the steel sheets obtained during the trials and table 4 gathers the result of evaluations of obtained properties.

TABLE 1

| Steel Samples | C | Mn | Si | Al | Cr | Nb | S | P | Ca | N | Mo | Cu | Ni | V | B | Ti |
|---|---|---|---|---|---|---|---|---|---|---|---|---|---|---|---|---|
| A | 0.144 | 2.12 | 0.65 | 0.52 | 0.03 | 0.012 | 0.002 | 0.014 | 0.0003 | 0.0060 | 0.005 | 0.03 | 0.010 | 0.002 | 0.0002 | 0.03 |
| B | 0.141 | 2.05 | 0.65 | 0.52 | 0.03 | 0.012 | 0.002 | 0.014 | 0.0003 | 0.0060 | 0.005 | 0.03 | 0.010 | 0.002 | 0.0002 | 0.03 |
| C | 0.138 | 2.02 | 0.65 | 0.52 | 0.03 | 0.012 | 0.002 | 0.014 | 0.0003 | 0.0060 | 0.005 | 0.03 | 0.010 | 0.002 | 0.0002 | 0.03 |
| D | 0.150 | 2.20 | 0.65 | 0.52 | 0.03 | 0.012 | 0.002 | 0.014 | 0.0003 | 0.0060 | 0.005 | 0.03 | 0.010 | 0.002 | 0.0002 | 0.03 | underline values: not according to the invention.

Table 2

Table 2 gathers the annealing process parameters implemented on steels of Table 1. The Steel compositions A to D serve for the manufacture of sheets according to the invention. Table 2 also shows tabulation of Ac1 and Ac3. These Ac1 and Ac3 are defined for the inventive steels and reference steels are determined empirically by dilatometry studies.

Following processing parameters are same for all the steels of Table 1. All steels of table 1 are heated to a temperature of 1120° C. before hot rolling and the hot rolling finishing temperature for all the steels is 900° C. Thereafter all steels of Table 1 are coiled at 620° C.

The table 2 is as follows:

TABLE 2

| Trials | Steel samples | CR reduction, % | Heating rate to soaking temperature (° C./s) | Soaking temperature (° C.) | Annealing time (s) | Cooling rate to overaging holding (° C./s) | overaging holding temperature (° C.) | overaging holding time (s) | Coating temperature (° C.) | Ac1 | Ac3 | Ms |
|---|---|---|---|---|---|---|---|---|---|---|---|---|
| I1 | A | 50 | | 843 | 140 | 13.5 | 470 | 37 | 460 | 750 | 930 | 145 |
| I2 | B | 53 | | 835 | 130 | 14.5 | 470 | 34 | 460 | 750 | 930 | 145 |
| I3 | B | 52 | | 843 | 150 | 12.2 | 470 | 41 | 460 | 750 | 930 | 145 |
| R1 | C | 52 | | 843 | 150 | 12.2 | 470 | 41 | 460 | 750 | 930 | 145 |
| R2 | D | 52 | | 830 | 150 | 12.2 | 470 | 41 | 460 | 750 | 930 | 145 |

I = according to the invention;
R = reference;
underlined values: not according to the invention.

Table 3 exemplifies the results of the tests conducted in accordance with the standards on different microscopes such as Scanning Electron Microscope for determining the microstructures of both the inventive and reference steels. The results are stipulated herein:

TABLE 3

| Trials | Steel Samples | Intercritical Ferrite (%) | Transformed Ferrite (%) | Bainite (%) | Residual Austenite (%) | Tempered Martensite (%) | Fresh Martensite (%) | Intercritical Ferrite + transformed Ferrite (%) |
|---|---|---|---|---|---|---|---|---|
| I1 | A | 50 | 26 | 0 | 11 | 0 | 13 | 76 |
| I2 | B | 49 | 30 | 0 | 10 | 0 | 11 | 79 |
| I3 | B | 50 | 31 | 0 | 9 | 0 | 10 | 81 |

TABLE 3-continued

| Trials | Steel Samples | Intercritical Ferrite (%) | Transformed Ferrite (%) | Bainite (%) | Residual Austenite (%) | Tempered Martensite (%) | Fresh Martensite (%) | Intercritical Ferrite + transformed Ferrite (%) |
|---|---|---|---|---|---|---|---|---|
| R1 | C | 50 | 33 | 0 | 7 | 0 | 10 | 83 |
| R2 | D | 50 | 24 | 0 | 10 | 0 | 16 | 74 |

I = according to the invention;
R = reference;
underlined values: not according to the invention.

Table 4

Table 4 exemplifies the mechanical properties of both the inventive steel and reference steels. In order to determine the tensile strength, yield strength and total elongation, tensile tests are conducted in accordance of ASTM standards.

The results of the various mechanical tests conducted in accordance to the standards are gathered

TABLE 4

| Steel Samples | Trials | Tensile Strength (in MPa) | Yield Strength (in MPa) | Total Elongation ASTM-L (in %) | Hole Expansion Ratio (in %) |
|---|---|---|---|---|---|
| A | I1 | 864 | 490 | 20 | 22.0 |
| B | I2 | 828 | 464 | 24 | 26.0 |
| C | I3 | 796 | 459 | 21 | 24.0 |
| D | R1 | 777 | 390 | 24 | 22.0 |
| E | R2 | 930 | 460 | 19 | 16.0 |

I = according to the invention; R = reference; underlined values: not according to the invention.

What is claimed is:

1. A cold rolled and coated steel sheet comprising:
a composition of the following elements, expressed in percentage by weight:
0.140%≤Carbon≤0.2%
1.5%≤Manganese≤2.15%
0.5%≤Silicon≤0.8%
0.4%≤Aluminum≤0.8%
0%≤Phosphorus≤0.09%
0%≤Sulfur≤0.09%
0%≤Nitrogen≤0.09%
0.01%≤Niobium≤0.1%
0.01%≤Titanium≤0.1%
and optionally one or more of the following elements:
0%≤Chromium≤0.1%
0%≤Nickel≤3%
0%≤Calcium≤0.005%
0%≤Copper≤2%
0%≤Molybdenum≤0.5%
0%≤Vanadium≤0.1%
0%≤Boron≤0.003%
0%≤Zirconium≤0.010%
a remainder of the composition being iron and unavoidable impurities caused by processing, a microstructure of the steel sheet comprising in area fraction, 40 to 60% of Inter-critical Ferrite, 25 to 45% of Transformed Ferrite, 8% to 20% of Residual Austenite, 5% to 20% Fresh Martensite, and 0 to 10% Bainite, wherein a cumulated amount of Inter-critical and Transformed Ferrite is between 75% and 85%.

2. The cold rolled and coated steel sheet as recited in claim 1 wherein the composition includes 0.5% to 0.7% of Silicon.

3. The cold rolled and coated steel sheet as recited in claim 1 wherein the composition includes 0.14% to 0.19% of Carbon.

4. The cold rolled and coated steel sheet as recited in claim 1 wherein the composition includes 0.4% to 0.7% of Aluminum.

5. The cold rolled and coated steel sheet as recited in claim 1 wherein the composition includes 1.7% to 2.15% of Manganese.

6. The cold rolled and coated steel sheet as recited in claim 4 wherein the composition includes 0.4% to 0.6% of Aluminium.

7. The cold rolled and coated steel sheet as recited in claim 5 wherein the composition includes 1.8% to 2.15% of Manganese.

8. The cold rolled and coated steel sheet as recited in claim 3 wherein the composition includes 0.14% to 0.18% of Carbon.

9. The cold rolled and coated steel sheet as recited in claim 1 wherein a cumulated amount of Silicon and Aluminum is between 0.9% and 1.2%.

10. The cold rolled and coated steel sheet as recited in claim 1 wherein a cumulated amount of Silicon and Aluminum is between 1% and 1.2%.

11. The cold rolled and coated steel sheet as recited in claim 1 wherein the carbon content of the Residual Austenite is between 0.8% and 1.1%.

12. The cold rolled and coated steel sheet as recited in claim 1 wherein the Inter-critical Ferrite is between 45% and 55%.

13. The cold rolled and coated steel sheet as recited in claim 1 wherein the Transformed Ferrite is between 25% and 40%.

14. The cold rolled and coated steel sheet as recited in claim 1 wherein the Fresh Martensite is between 5% and 15%.

15. The cold rolled and coated steel sheet as recited in claim 1 wherein the steel sheet has an ultimate tensile strength of 780 MPa or more, and a total elongation of 18% or more.

16. The cold rolled and coated steel sheet as recited in claim 15 wherein said steel sheet has a yield strength of 400 MPa or more and a hole expansion ratio of greater than equal to 20%.

17. A method of production of the cold rolled and coated steel sheet as recited in claim 1 comprising the following successive steps:
providing a semi-finished product with a steel composition of the following elements, expressed in percentage by weight:
0.140%≤Carbon≤0.2%
1.5%≤Manganese≤2.15%
0.5%≤Silicon≤0.8%
0.4%≤Aluminum≤0.8%

0% ≤ Phosphorus ≤ 0.09%
0% ≤ Sulfur ≤ 0.09%
0% ≤ Nitrogen ≤ 0.09%
0.01% ≤ Niobium ≤ 0.1%
0.01% ≤ Titanium ≤ 0.1%
and optionally one or more of the following elements:
0% ≤ Chromium ≤ 0.1%
0% ≤ Nickel ≤ 3%
0% ≤ Calcium ≤ 0.005%
0% ≤ Copper ≤ 2%
0% ≤ Molybdenum ≤ 0.5%
0% ≤ Vanadium ≤ 0.1%
0% ≤ Boron ≤ 0.003%
0% ≤ Cerium ≤ 0.1%
0% ≤ Magnesium ≤ 0.010%
0% ≤ Zirconium ≤ 0.010%
a remainder of the composition being iron and unavoidable impurities caused by processing;

reheating said semi-finished product to a temperature between 1000° C. and 1280° C.;

rolling the semi-finished product in the temperature range between Ac3+100° C. and Ac3+200° C., wherein the hot rolling finishing temperature is above Ac3 to obtain a hot rolled steel;

cooling the hot rolled steel at a cooling rate of at least 30° C./s to a coiling temperature between 475° C. and 650° C.; and coiling the said hot rolled steel;

cooling the hot rolled steel to room temperature;

optionally performing a scale removal process on the hot rolled steel sheet;

optionally annealing the hot rolled steel sheet between 400° C. and 750° C.;

optionally performing a further scale removal process on the hot rolled steel sheet;

cold rolling the hot rolled steel sheet with a reduction rate between 35 and 90% to obtain a cold rolled steel sheet;

heating the cold rolled steel sheet from room temperature to soaking temperature between Ac1 and Ac3;

annealing at a soaking temperature for 5 to 500 seconds;

cooling the cold rolled steel sheet from the soaking temperature to an overaging temperature between 425° C. and 500° C. at an average cooling rate of at least 5° C./s;

overaging the cold rolled steel sheet at an overaging temperature for 5 to 500 seconds and bringing to a temperature range between 420° C. and 680° C. to facilitate coating;

coating the cold rolled sheet; and cooling the cold rolled steel sheet to room temperature with a cooling rate of at least 55° C./s to obtain a cold rolled coated steel sheet having the microstructure.

18. The method as recited in claim 17 wherein a coiling temperature is between 475° C. and 625° C.

19. The method as recited in claim 17 wherein the finishing rolling temperature is more than 950° C.

20. The method as recited in claim 17 wherein the average cooling rate between the soaking temperature and the overaging temperature is more than 10° C./s.

21. The method as recited in claim 17 wherein the soaking temperature is between Ac1+30° C. and Ac3-30° C. and the soaking temperature is selected so as to ensure the presence of at least 40% of austenite at the end of the soaking.

22. The method as recited in claim 21 wherein the soaking temperature is selected so as to ensure the presence of at least 50% of austenite at the end of the annealing.

23. The method as recited in claim 17 wherein the temperature for overaging is between 440° C. and 480° C.

24. The method as recited in claim 17 wherein the cooling rate after coating is at least 9° C./s.

25. A method for the manufacture of structural or safety parts of a vehicle comprising employing the cold rolled and coated steel sheet as recited in claim 1.

26. A vehicle comprising a part obtained by the method of claim 25.

* * * * *